United States Patent [19]

Ohtsuki et al.

[11] Patent Number: 4,677,583
[45] Date of Patent: Jun. 30, 1987

[54] APPARATUS FOR DECIMAL MULTIPLICATION

[75] Inventors: Toru Ohtsuki; Yoshio Oshima; Sako Ishikawa; Hideaki Yabe; Masaharu Fukuta, all of Hadano, Japan

[73] Assignee: Hitachi, Ltd., Tokyo, Japan

[21] Appl. No.: 625,131

[22] Filed: Jun. 27, 1984

[30] Foreign Application Priority Data

Jul. 1, 1983 [JP] Japan .................. 53-119556

[51] Int. Cl.$^4$ .................. G06F 7/52
[52] U.S. Cl. .................. 364/756
[58] Field of Search .................. 364/756, 771, 772

[56] References Cited

U.S. PATENT DOCUMENTS

| 3,644,724 | 2/1972 | Hristor et al. | 364/756 |
| 3,958,112 | 5/1976 | Miller | 364/771 |
| 4,543,641 | 9/1985 | Fukuta et al. | 364/756 |

OTHER PUBLICATIONS

Larson, "High-Speed Multiply Using Four Input Carry-Save Adder" *IBM Tech. Disclosure Bulletin* vol. 16, No. 7, Dec. '73, pp. 2053-2054.

Larson "Medium Speed Multiply" *IBM Tech. Disclosure Bulletin* vol. 16, No. 7, Dec. '73 p. 2055.

*Primary Examiner*—David H. Malzahn
*Attorney, Agent, or Firm*—Antonelli, Terry & Wands

[57] ABSTRACT

An apparatus for decimal multiplication divides a multiplier of binary coded decimal (BCD) into plural groups, generates plural partial products of which are multiplied a multiplicand of BCD and the plural groups of multiplier over successive cycles and adds them to an intermediate product which is a summation of the previously generated partial products. The addition of the partial product and the intermediate product is made by a carry save adder. At a first cycle, the intermediate product is set to zero, and the addition of 6 is made to each digit of either one of the intermediate product sum and the partial product, and the addition of the partial product and the intermediate product is made by a carry save adder loop over successive cycles. At a final cycle, the sum and carry from the carry save adder are added by a full adder, and the subtraction of 6 is made for each digit according to the existence of carry transfer in each digit of the full adder and the resultant value is output as a multiplication result.

11 Claims, 17 Drawing Figures

FIG. 4a $13 + 16 = 29$

|   | (i+1) | i |
|---|---|---|
| A = | 0001 | 0011 |
| +) | 0110 | 0110 |
| A' = | 0111 | 1001 |
| +) B = | 0001 | 0110 |
| R = | 1000 | 1111 |
| −) | 0110 | 0110 |
| R' = | 0010 | 1001 |

FIG. 4b $14 + 16 = 30$

|   | (i+1) | i |
|---|---|---|
| A = | 0001 | 0100 |
| +) | 0110 | 0110 |
| A' = | 0111 | 1010 |
| +) B = | 0001 | 0110 |
| R = | 1001 | 0000 |
| −) | 0110 (1) | 0000 |
| R' = | 0011 | 0000 |

FIG. 7

DECIMAL CARRY CORRECTION
TO SUM FROM CARRY SAVE ADDER

DECIMAL CARRY CORRECTION FOR HIGH ORDER DECIMAL DIGITS

FIG. 11

DECIMAL CARRY CORRECTION TO SUM FROM CARRY SAVE ADDER

FIG. 12

DECIMAL CARRY CORRECTION FOR HIGH ORDER DECIMAL DIGITS

FIG. 13  DECIMAL CARRY SAVE ADDER UNIT

DECIMAL LOOP ADDER FIG. 15

APPARATUS FOR DECIMAL MULTIPLICATION

BACKGROUND OF THE INVENTION

This invention relates to an apparatus for decimal multiplication for taking the sum of a partial product and an intermediate product by a loop adder and more particularly to an apparatus for decimal multiplication which enables high speed loop addition by using a carry save adder as the loop adder or carry save adders. This application is related with applications, U.S. Ser. No. 462,423 filed on Jan. 31, 1983, now U.S. Pat. No. 4,603,397 and U.S. Ser. No. 549,809 filed on Nov. 8, 1983, now U.S. Pat. No. 4,635,220.

When it is intended to multiply a multiplicand in binary code decimal form by a multiplier also in binary coded decimal form to obtain a final product in binary coded decimal form, as shown in FIG. 1, there is commonly used a system for effecting multiplications of a multiplicand by a multiplier having a predetermined processing width (for example, 1 digit) to provide n partial products, and this system then produces the final product by the addition of these partial products 1−n.

One example of the conventional apparatus for decimal multiplication for carrying out the operation such as shown in FIG. 1 is shown in FIG. 2. In this figure, the multiplication of a multiplier set in a multiplier register 1 and a multiplicand set in a multiplicand register 2 is carried out as follows. When a decimal partial product generator 4 is activated, a first decimal partial product operation of the multiplicand set in the multiplicand register 2 and the predetermined processing width partitioned out from the lower order digit of the multiplier set in the multiplier register 1 is performed, and this first decimal partial product is set in a partial product register 6. At the same time, zero (0) is set in an intermediate product register 5 (as an initial value), and the multiplier set in the multiplier register 1 is right-shifted by the partitioned-out data width by a shifter 3 and set again in the multiplier register 1. Next, the initial value 0 set in the intermediate product register 5 and the first decimal partial product set in the partial register 6 are added in a decimal loop adder 7 and the first decimal intermediate product is transferred to and set in the intermediate product register 5. Practically, the output from the decimal loop adder 7 is right-shifted by the predetermined processing width of the multiplier and set in the intermediate product register 5. The lowest order of the output from the decimal loop adder 7 corresponding to the predetermined processing width of the multiplier, is transferred to and set in the highest order multiplier predetermined processing width position of the multiplier register 1 through line 99, as the lowest order of the final product. A similar operation is repeated for all of the significant digits of the multiplier, which provides the lower portion of the decimal final product of the multiplier significant digit width left-justified in the multipler 1 and the higher portion of the decimal final product as an output from the decimal loop adder 7 at a final operation cycle. Thereafter the higher portion of the decimal final product, which is provided as an output from the decimal loop adder 7, is transferred to and set in the multiplicand register 2 through line 98.

In the manner mentioned above, the product represented in binary coded decimal form can be obtained by multiplying the multiplicand represented in binary coded decimal form by the multiplier represented in the same notation. The speed up of the operation of the decimal loop adder 7 provides one means of realizing high speed decimal multiplication.

The decimal loop adder is commonly constructed as shown in FIG. 3. The operation thereof is as follows. Prior to an addition of two inputs A and B, first, the input A is added with 6 for each digit of the binary coded decimal thereof by 6- adder circuits $9_i$, $9_{i+1}$, ... (i: any digit) (providing A'), and this output A' and the other input B are added in binary operation (providing R). During the binary addition, when a carry does not occur from one digit of the binary coded decimal (named as a first case), R is 6-subtracted for each digit of the binary coded decimal by 6-subtraction circuits $11_i$, $11_{i+1}$. When the carry occurs (named as a second case), a 6-subtraction correction circuits $12_i$, $12_{i+1}$ are controlled so that the value of R itself is used as an output from the decimal loop adder. FIG. 4a shows an example of the first case and FIG. 4b shows an example of the second case. Such a technique is also disclosed in H. HELLERMAN "DIGITAL COMPUTER SYSTEM PRINCIPLES" (McGRAW-HILL BOOK Co., 1967), pp. 300–301. In the manner described above, two binary coded decimals are input and binary-added and the sum thereof is obtained. But, since in the binary addition, a next operation cycle cannot be started till the carry is transferred from a least significant bit to a most significant bit, this technique has a limit of implementing high-speed operation from the point of view of the system.

On the other hand, one exemplary construction realizing the high speed operation of a loop adder in a binary multiplication apparatus is shown in FIG. 5. Such a construction is disclosed in K. HWANG "Computer Arithmetic PRINCIPLES, ARCHITECTURE, AND DESIGN" (John Wiley & Sons, Inc., 1979), etc. The carry occurring during the multiplication is saved or reserved as a saved carry in the loop adder, and after all of the significant digits of a multiplier are subjected to, the operation of the carry propagation is lastly processed. In FIG. 5, the multiplication of a multiplier set in the register 1 and a multiplicand set in the multiplicand register 2 is performed as follows. When a binary partial product generator 13 is activated, a first binary partial product operation of the multiplicand set in the multiplicand register 2 and the predetermined processing width partitioned-out from the lower order bit of the multiplier set in the multiplier register 1 is performed, and this first partial product is set in partial product registers 16 and 17. A carry save adder is commonly used also as the binary partial product generator 13. And in FIG. 5, the partial product is also in the partial product sum register 16 and the partial product carry register 17 in the forms of a sum (partial sum) and saved carry, respectively. At the same time, zero (0) is set in an intermediate sum register 14 and an intermediate product carry register 15 as an initial value, and the multiplier set in the multiplier register 1 is right-shifted by the shifter 13 after a necessary width of data is partitioned out, and set in the multiplier register 1. The initial value zero set in the intermediate product sum register 14 and the intermediate product carry register 15, and the first partial product sum and carry set in the partial product sum register 16 and the partial product carry register, respectively, are carry-save-added by two stages of carry save adders 18 and 21 both encircled by a dashed line 23, and the sum and carry of the first intermediate product are transferred to and set in the intermediate product sum register 14 and the intermediate product carry register 15. Then, where the carry output from the carry save adder is transferred, to a next stage of the adder, it is one-bit left-shifted for the purpose of carry alignment by one-bit-left-shift circuits 19, 20 and 22. The sum output from the carry save adder 21 and the output from the one-bit-left-shift circuit 22 are right-shifted by shifters 24 and 25 by the predetermined processing data width of the multiplier, and set in the intermediate product sum register 14 and the intermediate product carry register 15. The data of the lowest order multiplier predetermined processing width of the sum output from the carry save adder and the output from the one-bit-left-shift circuit 22, both being equal to predetermined processing width of the multiplier, are input to a spill adder 26 and binary-added therein. This output from the spill adder 26, i.e., the lowest order of the final product with the predetermined processing multiplier width the final product, is transferred to and set in the highest order position of predetermined processing multiplier width of the multiplier register 1.

The similar processing is repeated for all of the significant digits of the multiplier. Thus, the lower order portion of the final product with multiplier significant digits width is left-justified in the multiplier register 1, while the higher order portion of the final product is obtained from the sum output of the carry save adder 21 and the output from the one bit left shift circuit 22, which is obtained by one-bit left-shifting the carry output of the carry save adder 21, in the forms of sum and carry, respectively, at a final operation cycle. The sum and carry of the higher order portion of the final product are input to a full adder 27 and binary-added therein. The output from the full adder 27, i.e., the higher order portion of the final product is transferred to and set in the multiplicand register 2.

In the manner mentioned above, a binary product is obtained by multiplying a binary multiplicand by a binary multiplier. In this case, as seen from FIG. 5, the carry save adders 18 and 21 can be constructed with one or two stages of gates, and the waiting for the completion of the carry propagation from the least significant bit of the adder to the most significant bit thereof is not required, so that a high-speed loop adder can be constructed. However, unlike a binary code, a binary coded decimal uses four bits width to represent one digit, and deals with 0 to 9 only as a numerical value so that a carry save adder for binary number at the sum output and carry output of which binary values $(1010)_2-(1111)_2$ exceeding a decimal notation representation appear can be disadvantageously unapplicable to a decimal multiplication as it is.

SUMMARY OF THE INVENTION

An object of this invention is to provide an apparatus for decimal multiplication such as can perform high speed decimal loop addition by using a carry save adder as a loop adder when decimal multiplication is carried out through a partial product generation and the loop addition (repetitive addition) of the operated partial product and intermediate product.

The decimal multiplication apparatus according to this invention operates the product of a multiplicand and multiplier which are a binary coded decimal. The decimal multiplication apparatus divides the multiplier into a plurality of groups each of which includes at least one digit, generates the partial products of the multiplicand and the respective groups over successive operation cycles, and adds the partial product to an intermediate product which is a sum of succeding partial products. The intermediate product is obtained in the forms of sum and carry. The decimal multiplication apparatus includes a carry save adder unit which performs in each of the operation cycles a carry save addition of the partial product and the intermediate product which is obtained in the form of the intermediate sum and carry.

At a first operation cycle, the intermediate product is zero and each digit of either one of the intermediate products, i.e., the intermediate sum or the intermediate carry, or the partial product is added with 6. The carry save adder unit includes a carry save adder and correction means. The correction means corrects the value of the sum or result of the carry save addition, digitwise simultaneously and corrects the carry propagation digitwise at the partial product of a succeeding operation cycle conceptually, if necessary, on the basis of the rule derived from a combination of the values of the sum and the carry, the results of the carry save addition.

The output from the carry save adder unit is used as the intermediate product in the succeeding operation cycle. At a final operation cycle, the sum and carry from the carry save adder unit are binary full-added and each digit of the final product is obtained by selecting the result of binary full-addition itself when a carry is generated at the digit or selecting the value subtracted by 6 from the result when no carry is generated.

BRIEF DESCRIPTION OF THE DRAWINGS

FIGS. 4a and 4b are views for explaining the operation of the decimal adder shown in FIG. 3;

FIG. 7 is an addition table for explaining the decimal carry correction according to this invention;

FIG. 11 is a view showing the other example of the decimal carry correction table for a sum output of a carry save adder;

FIG. 12 is a view showing the other example of the decimal carry correction table higher order decimal digit;

DESCRIPTION OF THE PREFERRED EMBODIMENTS

Figure 6:
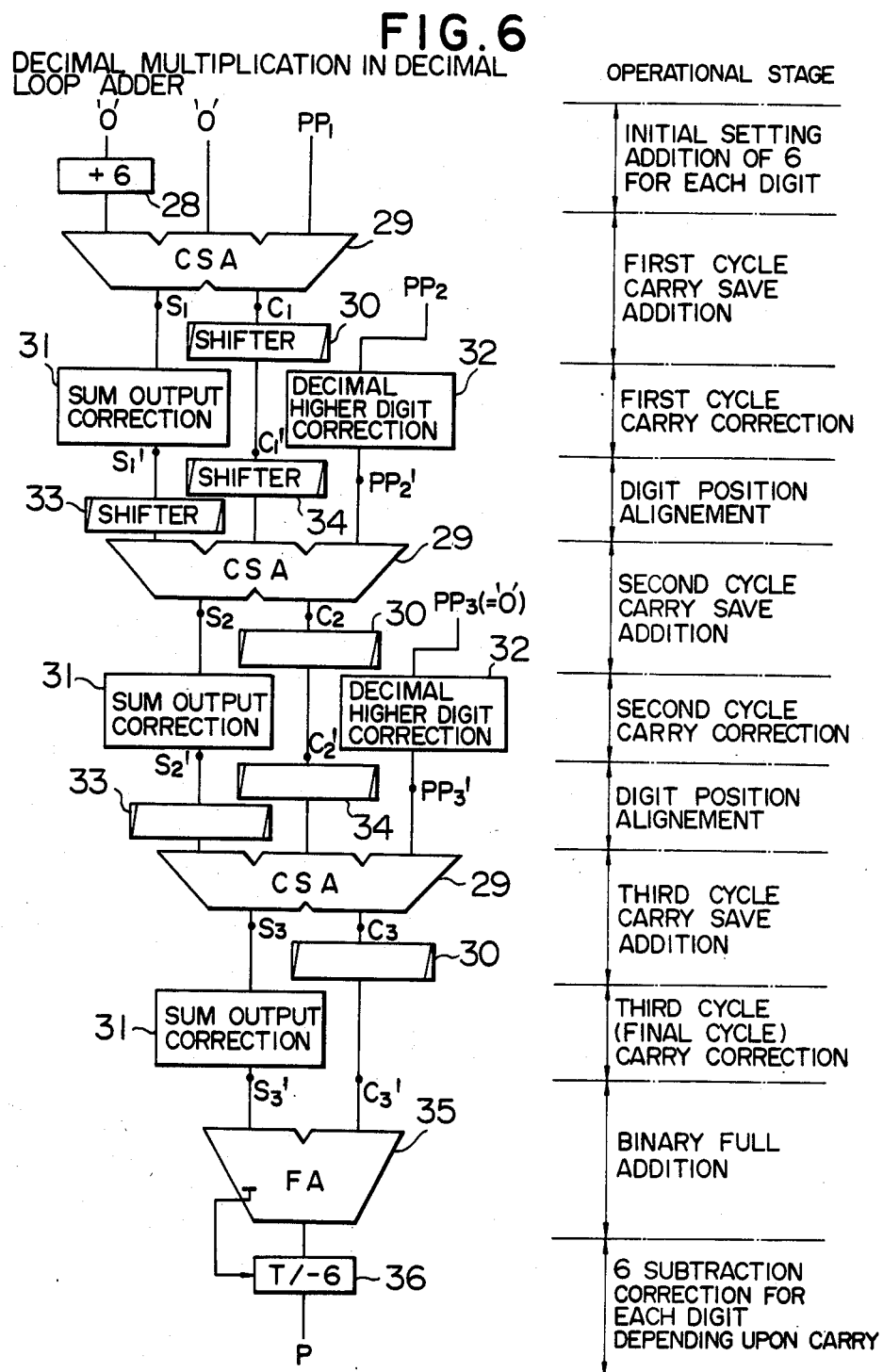
FIG. 6 is a view for showing the operational concept of the decimal multiplication apparatus according to this invention.
Figure 7:
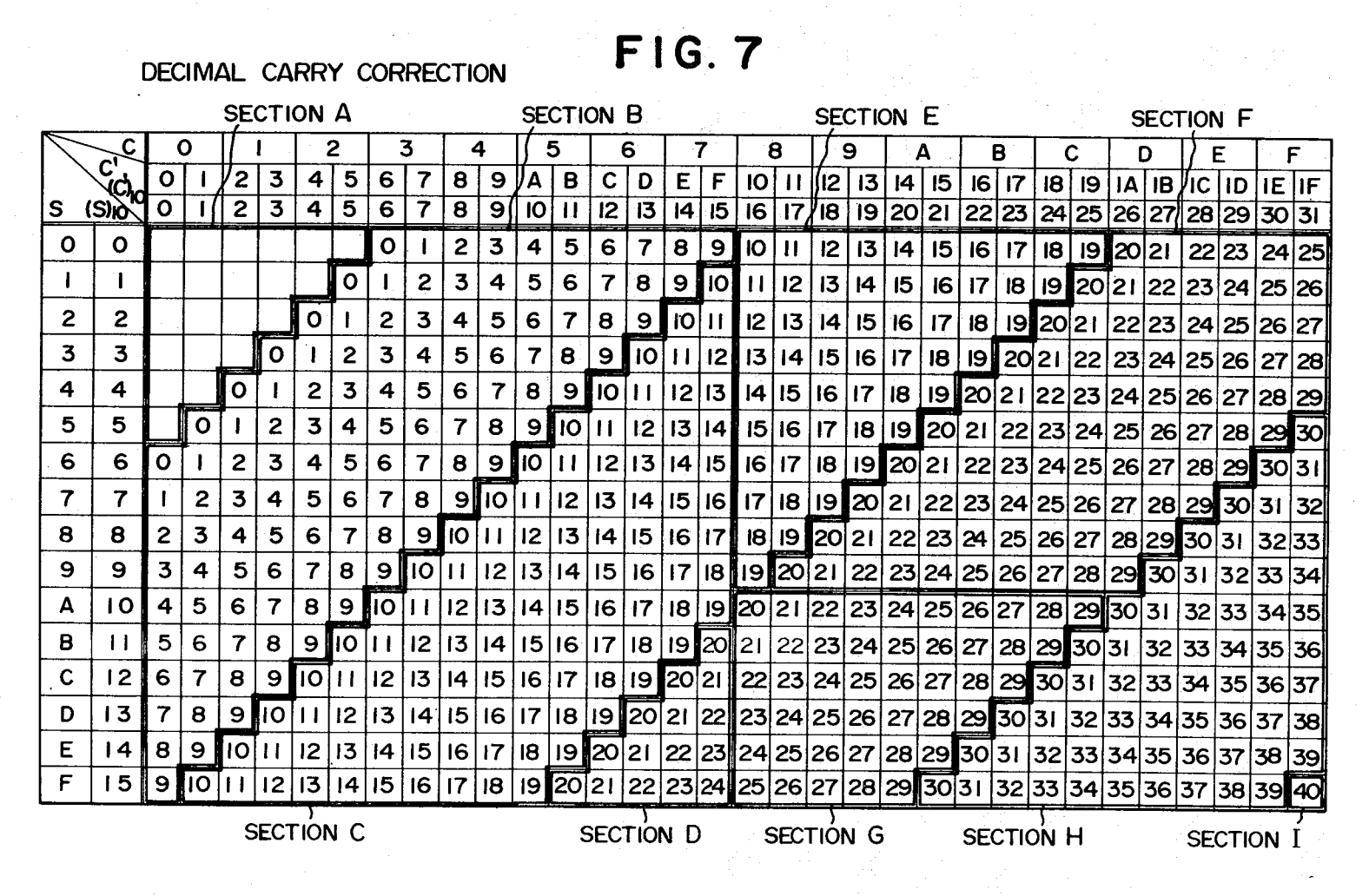

Prior to explaining the embodiments of this invention, the operational principle of this invention will be first explained referring to FIGS. 6 and 7.

FIG. 6 is a view for explaining the operational concept of the system for obtaining the final product or result through the repetition of decimal loop addition by using a decimal loop adder including a carry save adder in its configuration. In the figure, the members which are repeatedly represented such as a carry save adder (CSA) 29 are repeatedly employed in each cycle, $PP_1$-$PP_3$ are decimal partial products for respective operation cycles; P is the decimal final product; $S^1$-$S_3$ and $C_1$-$C_3$ are sum outputs and carry outputs from the carry save adders for respective operation cycles; and $S'_1$-$S'_3$ are sums respectively corrected by the sum-output-correction circuit 31 during the carry correction stage, $C'_1$-$C'_3$ are carries respectively bit-aligned by the shifter 30 and $PP'_1$-$PP'_3$ are decimal partial products respectively modified by the decimal-higher-digit-correction circuit 32 during the carry correction stage. A loop addition is started by adding 6 to each digit of a decimal number as an initial setting by a 6-addition correction circuit 28. The first decimal addition of the intermediate product; in the form of sum and carry and the decimal partial product $PP_1$ is as follows:

(1) The intermediate product, in the form of sum and the decimal partial product PP, obtained by the other operation means are carry-save-added by a three-input carry save adder CSA 29. The carry output $C_1$ of the carry save adder 29 is left shifted by one bit by the shift circuit 30 in order to align its bit position. <<CARRY SAVE ADDITION stage>>.

(2) The values of each digit of the sum output $S^1$ and the carry output $C_1$ are examined and the amount of correction for the sum $S^1$ and the higher order decimal digit are determined so that a correct intermediate product is obtained when the sum S', the output of the sum output correction circuit 31 after carry correction, and the carry C', the output of the shift circuit 30 performing alignment of bit portion, are binary full added. <<CARRY CORRECTION stage>>.

(3) If the sum S' after carry correction and the carry C' after bit position alignment are input to the carry save adder 29 at a next cycle they are right-shifted by the processing width of the multiplier by shifters 33 and 34 in order to high digit positions of the intermediate product against second intermediate product $PP_2$. <<DIGIT POSITION ALIGNMENT STAGE>>.

Such a processing is adopted as one operation cycle. The operation cycles determined by the number of the decimal partial products PP corresponding to the significant digits of the multiplier are repeated to obtain a final product.

FIG. 6 shows the case where two decimal partial products, i.e., $PP_1$ and $PP_2$ are decimal-added. Where 2 or 3 decimal carries are saved or reserved in and by the sum output $S_2$ of the carry save adder 29 and the carry $C_2'$ after bit position alignment as a result of the loop addition for the decimal partial product in a second cycle, i.e., the operation cycle corresponding to the final multiplier digit, the carry correction is completed by the carry save addition with the decimal partial product $PP_3$ having zero value in a third cycle (final cycle). The sum $S_3'$ and carry $C_3'$ are binary-full-added by using a binary full adder 35. Each digit of the decimal final product P is obtained by means of selecting the result of binary full-addition itself when a carry is generated at the digit or selecting the value subtracted by a 6 from the result through the 6-subtraction-correction circuit 36 when no carry is generated. In the manner mentioned above, the entire operation of decimal multiplier is performed to provide a correct final product.

It will be described later that the decimal carry can be saved by 0-3 in and by the sum output S from the carry save adder and the carry C' after bit position alignment.

FIG. 7 is an addition table of the outputs from the carry save adder and the number in each entry of the table is a decimal number which should be a result of the addition of the sum output S and the carry C' which have the width of a decimal digit. The sum output S and the carry output C of the carry save adder which have a decimal digit width and the carry C', one bit left shifted output of the carry C for bit position alignment. In the figure, S, C and C' are hexadecimal, and $(S)_{10}$ and $(C')_{10}$ are decimal notation. The numbers 0-40 indicated in the entries at which S are C cross are decimal notations although they are not expressed as ( )$_{10}$. Hereinafter, ( )$_2$ implies a binary notation, ( )$_{10}$ implies a decimal notation and " " implies a hexadecimal notation. Apparently, one digit of the decimal notation is the same as that of the hexadecimal notation, hence, is some cases the indications of the notation are not made.

The decimal number to be obtained as a result of the addition of the sum output and the carry output of the carry save adder is calculated by using the expression $(S)_{10}+(C')_{10}-(6)_{10}$ since the operation is performed after the addition of $(6)_{10}$ for each decimal digit as an initial setting for a loop adder. For example, where the sum output S and the carry output C of the carry save adder for a certain decimal digit are S="6" and C="3", respectively, C' is C'="6" or C'="7" depending upon whether the value of C of the lower order digit of the pertinent decimal digit is "0"-"7" or "8"-"F". When the value of C of the lower order digit is "0"-"7", then C'="6", and when the value of C of the lower order digit is "8"-"F", then C'="7". Practically, C="3" is expressed as $(0011)_2$ and it becomes $(011X)_2$ when it is one bit left shifted. X indicates a most significant bit of C of the lower order digit and its value is either zero or one. Therefore, where the value of C of the lower order digit is "0"-"7", it is expressed as $(0XXX)_2$ and the most significant bit is 0 so that this 0 becomes the least significant bit of the above mentioned digit $(011X)_2$. Thus, $(011X)_2$ is $(0110)_2$, i.e., it shows the value of "6". Where the value of C of the lower order digit is "8"-"F", it is expressed as $(1XXX)_2$ and the most significant bit is 1 so that this 1 becomes the least significant bit of the above mentioned digit $(011X)_2$. Thus $(011X)_2$ is $(0111)_2$, i.e., it shows the value of "7". Where S="6" and C="3", C'="7" when the value of C of the lower order digit is "8"-"F", and the number "7" in the crossing entries of the table is obtained from the calculation $$(S)_{10}+(C')_{10}-(6)_{10}="6"+"7"-"6"="7".$$

In the operation system such as shown in FIG. 6 the sum output S, the carry output C and the carry C' of the carry save adder can be "0"~"F" in hexadecimal notation, and the sum and carry are full-added in the binary full adder. A proper correction must be made for the sum S and the higher order digit of the pertinent decimal digit based on a combination of the values of the sum S, the carry C and the carry C' in order to provide correct values, i.e., decimal numbers such as shown in FIG. 7 by using the decimal number operation system which selects the value itself is generated when a carry at the decimal digit, and which selects the value subtracted by $(6)_{10}$ from the result of the full addition where no carry is generated (hereinafter referred to as decimal number operation system).

The addition table of FIG. 7 is divided into 9 sections of A~I based on the number of decimal carries, and the sum output S, the carry output C and the carry C' of the carry save adder and proper decimal carry corrections are made for the respective sections as follows.

The section A is the area where the values of the sum S and the carry C' satisfy the condition "0"≦S+C'≦"5", which does not actually occur since an operation is performed after a $(6)_{10}$ addition for each one decimal digit is made as an initial setting. In the operation system such as shown in FIG. 6 which are constructed by using carry save adders and carry determining correction circuits satisfying the decimal carry logics shown in the addition table of FIG. 7, in order that the values of the sum and carry of a final product, such as $S_3'$ and $C_3'$ in FIG. 6, satisfy the condition "0"≦$S_3'$+$C_3'$≦5, an operation must be started without the addition of $(6)_{10}$ for each decimal digit as an initial setting for the operation, so that the combination of the sum S and the carry C' satisfying the condition "0"≦S+C'≦5 does not occur.

The section B is the area where the values of the sum S and the carry C' satisfy the condition "6"≦S+C'≦"F" and the carry to the higher order digit does not occur. Therefore, the decimal number operation system can be adapted to the section B as it is, and the sum S and the carry C' are binary-full added and thereafter the $(6)_{10}$ subtraction correction is made. For example, where S="6", C'="7", and hence S+C'−"6"="6"+"7"−"6"="7". Thus, the decimal carry corrections for the sum output S after the carry save addition and for the decimal higher order digit are not required for the section B.

The section C is the area where the values of the sum S and the carry C' satisfy the condition "10"≦S+C'≦"19" and the carry saved in S and C' by 1 is propagated to the higher order decimal digit by the binary full addition. And, consequently, the resultant value of addition can be a proper expression of decimal number as it is. Therefore, the section C is an area to which the decimal number operation system can be adapted with no modification. Thus, the decimal carry corrections to the sum output S after the carry save addition and to the decimal higher order digit are not required. For example, where S="A", C'="F", and hence S+C'="A"+"F"="19".

The section D is the area where when the carry output C from the carry save adder is one bit left-shifted for bit position alignment, to obtain the carry C', the value of the carry C is such as which does not have the explicit carry to be propagated to the decimal higher order digit as a result of the carry save addition, i.e., "0"≦C<"7", and the values of the sum S and the carry C' satisfy the condition "1A"≦S+C'≦"1E". Additionally, "1A" indicates $(26)_{10}$ and "1E" indicates $(30)_{10}$. In the section D, the carry is saved in S and C' by 2. The one 1 is being saved in S and C' since the carry is propagated to the decimal higher order digit by the decimal number operation system, while the other 1 is subjected to the decimal carry correction since the binary full addition of S and C' results in a value of "A"~"E" which exceed the binary coded decimal notation and therefore, the value of result must be expressed as "10"~"14". The decimal carry correction to the section D is performed in such a manner that the $(6)_{10}$ addition using $(16)_{10}$ as a module is made to the decimal digit of the sum output from the carry save adder, and one is added to the higher order digit to the pertinent decimal digit. Hereinafter, the addition using $(16)_{10}$ as a module is indicated with (mod 16). For example, in the case where S="E", C="6" and C'="D", S'=S+"6" (mod 16)="E"+"6" (mod 16)="4" provided that the sum after decimal carry correction is shown as S' and the addition of one to the higher order digit of the decimal digit is expressed with the addition of "10", and hence the operation results in S'+C'+"10"="4"+"D"+"10"="21".

In the sections E≦I, the value of the carry output C from the carry save adder is "8"≦C≦"F" so that when a carry output C is one-bit left shifted for bit position alignment to obtain a carry C', a carry is explicitly propagated to the higher order digit of the pertinent decimal digit. Consequently, "10"≦C'≦"1F". And in order to obtain a correct decimal by applying the decimal number operation system to the carry C' and the sum output S, the addition of 6 (mod 16) is made to the decimal digit of the sum output. For example, where S="0", C="8", and then C'="10", S'=S+"6" (mod 16)="0"+"6" (mod 16)="6" and hence S'+C'−"6"="6"+"10"−"6"="10" when S' is the sum after decimal carry correction.

The section E is the area where the carry propagation to the higher order digit of the pertinent decimal digit explicitly occurs in the carry C' as mentioned above, i.e., "8"≦C≦"F", and the values of the sum and the carry C' satisfy the condition "10"≦S+C'≦"19". In the section E, the decimal carry correction to the sum output S resulting from the above explicit carry propagation in the carry C', i.e., $(6)_{10}$ addition (mod 16) is made to the pertinent decimal digit of the sum S. For example, where S="4", C="A" and then C'=15, the sum S' after decimal carry correction is S'=S+"6" (mod 16)="4"+"6" (mod 16)="A" and hence the operation results in S'+C'−"6"="A"+"15-"−"6"="19".

The section E is the area where the carry propagation to the higher order digit of the pertinent decimal digit explicity occurs in the carry C', i.e., "8"≦C≦"F", the values of the sum S and the carry C' satisfy the condition 1A≦S+C'≦23, and the sum S also satisfies the condition "0"≦S≦9. In the F section, there two carries; one is to be explicitly propagated to the higher order digit of the pertinent decimal digit in the carry C', and the other is saved in the sum S and the carry C'. The decimal carry correction due to the explicit carry propagation to the higher order digit of the pertinent decimal digit in the carry C' is made by the addition of $(6)_{10}$ (mod 16) to the sum S, as described above. On the other hand, the carry saved in the sum S and the carry C' is remained saved there since a carry can be propagated to the higher order digit of the pertinent decimal digit by applying the decimal number operation system to the value of the sum after the decimal carry correction to the sum S resulting from the explicit carry propagation to the higher order digit of the pertinent decimal digit in the carry C′, and to the carry C′. Thus, the decimal carry correction to the section F is made by the addition of $(6)_{10}$ (mod 16) to the decimal digit of the sum output S from the carry save adder. For example, where S="8", C="D" and then C′="1B", the sum S′ after the decimal carry correction is S′=S+"6" (mod 16)="8"+"6" (mod 16)="E". Accordingly, the operation results in S′+C′="E"+"1B"="29".

The section G is the area where the carry propagation to the higher order digit of the partinent decimal digit explicitly occurs in the carry C′, i.e., "8"≦C≦"F", the values of the sum and the carry C′ satisfy the condition "1A"≦S+C′≦"23" and the sum S also satisfies the condition "A"≦S≦"F". In the G section, there are two carries; one is to be explicitly propagated to the higher order digit of the pertinent decimal digit in the carry C′, and the other is saved in the sum S and the carry C′. The decimal carry correction to the explicit carry propagation to the higher order digit of the pertinent decimal digit in the carry C′ is made by the $(6)_{10}$ addition (mod 16) to the sum S, as described above. On the other hand, the decimal carry correction to the carry saved in the sum S and the carry C′ is made by the $(6)_{10}$ addition (mod 16) to the value of the sum S and by the addition of one to the higher order digit of the pertinent decimal digit. This is carried out in order to obtain a correct decimal number by applying the decimal number operation system to the value of the sum after the decimal carry correction to the sum S resulting from the explicit propagation to the higher order digit of the pertinent decimal digit in the carry C′, and to the carry C′. Thus, the decimal carry correction to the section G is made by the addition of $(12)_{10}$ (mod 16) to the pertinent decimal digit of the sum output S from the carry save adder and by the addition of one to the higher order digit of pertinent the decimal digit. For example, in the case where S="B", C="8", and then C′="11", S′=S+"C" (mod 16)="B"+"C" (mod 16)="7" provided that the sum after decimal carry correction is shown as S′ and the addition of one to the higher order digit of the pertinent decimal digit is expressed with the addition of "10", and hence the operation results in S′+C′+"10"-"6"="7"+"11"+"10"-"6"="22".

The section H is the area where the carry propagation to the higher order digit of the pertinent decimal digit explicity occurs in the carry C′, i.e., "8"≦C≦"F", and the values of the sum S and the carry C′ satisfy the condition "24"≦S+C′≦"2D". In the section H, there are three carries; one is to be explicitly propagated to the higher order digit of the pertinent decimal digit in the carry C′, and two carries are saved in the sum S and the carry C′. The decimal carry correction to the explicit carry propagation to the pertinent decimal digit in the carry C′ is made by the addition of $(6)_{10}$ (mod 16) to the sum S as mentioned above. Further, the one of two carries saved in the sum S and the carry C′ is remained saved there since a carry is propagated to the higher order digit of a pertinent decimal digit by applying the decimal number operation system. On the other hand, the other one carry is subjected to the decimal carry correction by the addition of $(6)_{10}$ (mod 16) to the value of the sum S and by the addition of one to the higher order digit of the decimal digit. Thus, the decimal carry correction to the section H is made by the addition of $(12)_{10}$ (mod 16) to the decimal digit of the sum output S from the carry save adder and by the addition of one to the higher order digit of the decimal digit. For example, in the case where S="D", C="B", and then C′="17", S′=S+"C" (mod 16)="D"+"C" (mod 16)="9" provided that the sum after decimal carry correction is shown as S′ and the addition of one to the higher order digit of the pertinent decimal digit is expressed with the addition of "10", and hence the operation result in S′+C′+"10"="9"+"17"+"10"="30".

The section I is the area where the carry propagation to the higher order digit of the pertinent decimal digit explicitly occurs in the carry C′, i.e., "8"≦C≦"F", and the values of the sum S and the carry C′ satisfy the condition S+C′="2E". In the section I, there are 4 carries; one is to be explicitly propagated to the higher order digit of the pertinent decimal digit in the carry C′, and 3 carries are saved in the sum S and the carry C′. The decimal carry correction to the explicit carry propagation to the decimal digit in the carry C′ is made by the addition of $(6)_{10}$ (mod 16) to the pertinent decimal digit of the sum S as mentioned above. Further, the one of three carries saved in the sum S and the carry C′ is remained saved there since a carry is propagated to the higher order digit of a pertinent decimal digit by applying the decimal number operation system. On the other hand, the other 2 carries are subjected to the decimal carry correction by the additions of $(12)_{10}$ (mod 16) to the value of the sum S and of 2 to the higher order digit of the pertinent decimal digit. Thus, the decimal carry correction to the section I is made by the addition of $(18)_{10}$ (mod 16) to the decimal digit of the sum output S from the carry save adder and by the addition of 2 to the higher order digit of the pertinent decimal digit. For example, in the case where S="F", C="F" and C′="1F", S′=S+"12" (mod 16)="F"+"12" (mod 16)="1" provided that the sum after decimal carry correction is shown as S′ and the addition of 2 to the higher order digit of the pertinent decimal digit is expressed with the addition of "20", and hence the operation results in S′+C′+"20"="1"+"1F"+"20"="40".

The summary of the decimal carry corrections in the sections A∼I of the addition table of FIG. 7 is as follows.

The section A is the area where the combination of S and C′ does not occur. In the sections B and C, the correction is not required. In the section D, the correction is made by the addition of $(6)_{10}$ (mod 16) to the sum S and by the addition of one to the higher order digit of a pertinent decimal digit. In the section E and F, the correction is made by the addition of $(16)_{10}$ (mod 16) to the sum S. In the sections G and H, the correction is made by the additions of $(12)_{10}$ (mod 16) to the sum S and by the addition of one to the high order digit to the pertinent decimal digit. In the section I, the correction is made by the addition of $(18)_{10}$ (mod 16) and by the addition of two to the higher order digit of the pertinent decimal digit.

Meanwhile, some combinations of the sum S and carry C′ the sections I and H do not actually and this is provable. Particularly, in the case of implementation of this invention to the section I is not required. Further, when the decimal carry correction is made to the combinations of S and C′ included in the sections C, D, F and H, and the decimal number operation system is applied there to, a carry propagation to the higher order digit of the pertinent decimal digit occurs in the binary full addition of the sum S′ after correction and the carry C'. Therefore, in the sections C and F, the carry propagation can be in advance detected and hence the decimal carry correction thereto can be compulsively made. In other words, in the section C, the addition of $(6)_{10}$ (mod 16) to the sum output S and the addition of one to the higher order digit of the pertinent decimal digit can be made, while in the section F' the addition of $(12)_{10}$ (mod 16) to the sum output S and the addition of one to the higher order digit of the pertinent decimal digit.

Figure 8:
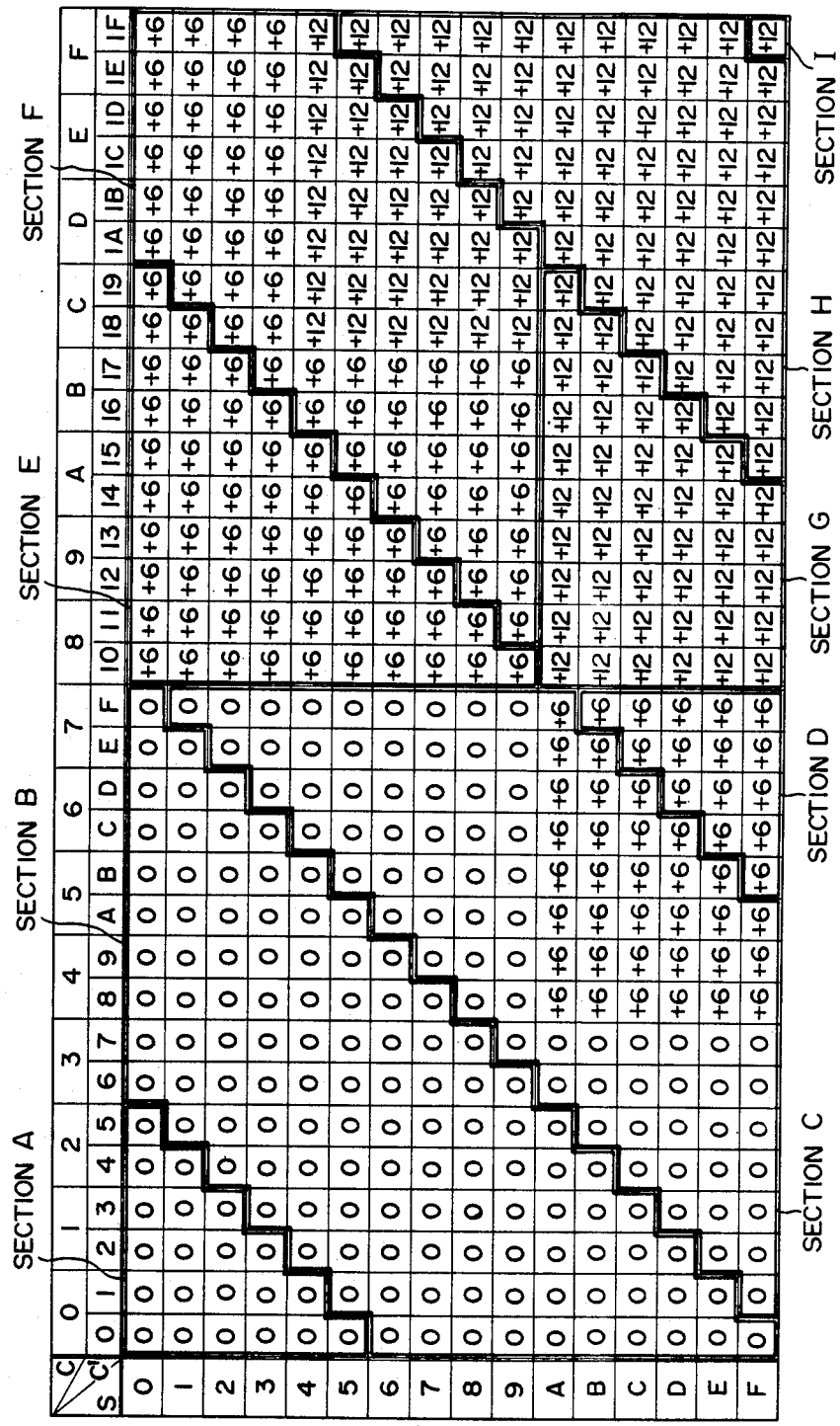
FIG. 8 is a view showing one example of the decimal carry correction table for a sum output from a carry save adder.
Figure 9:
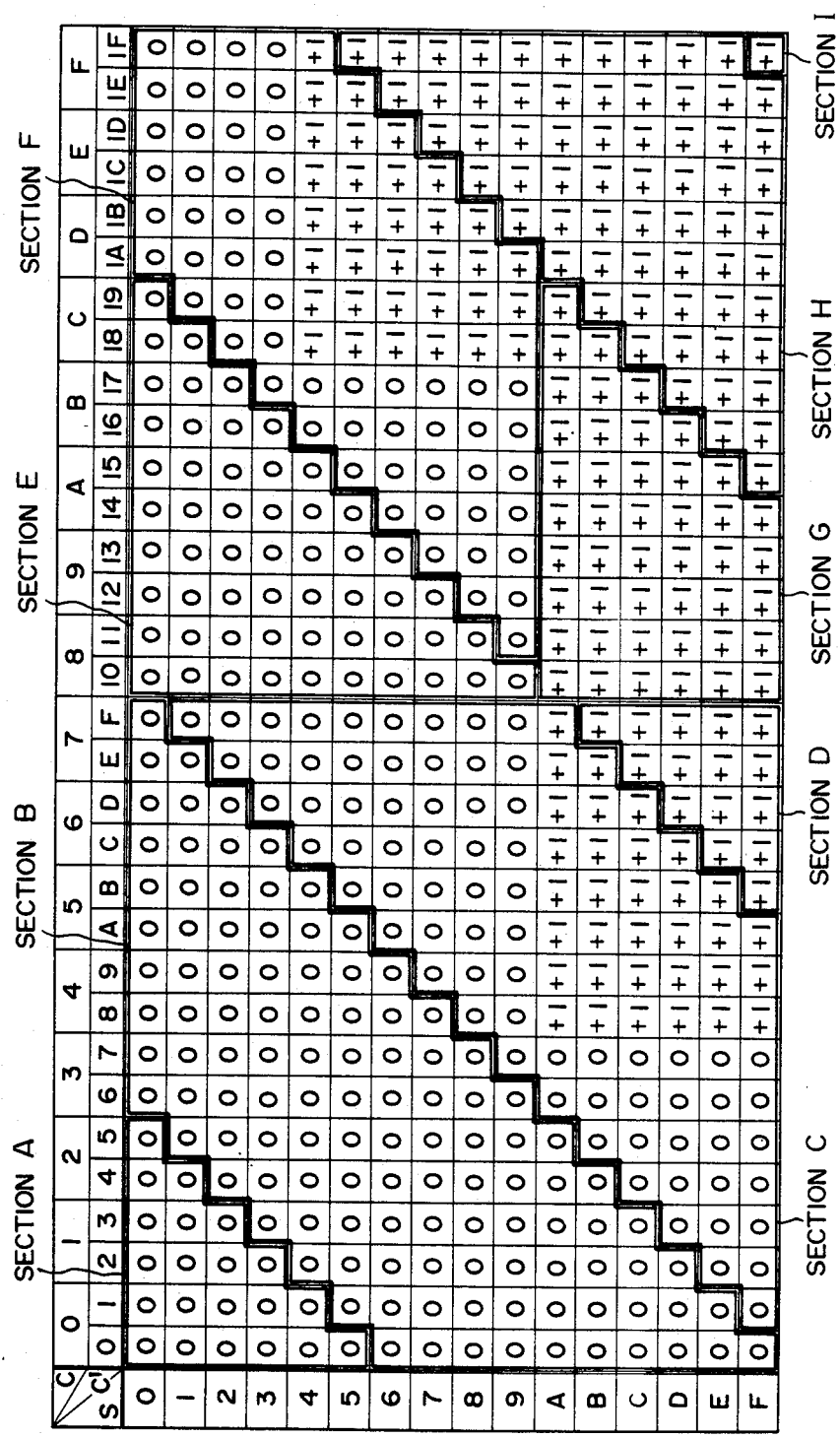
FIG. 9 is a view showing are example of the decimal carry correction table for high order decimal digit.

The first embodiment of decimal carry correction tables which satisfy the decimal carry corrections to the sum output and the higher order digit of the pertinent decimal digit in the sections A~I of the addition table of FIG. 7 and are used to implement a decimal loop adder using a carry save adder on the basis of the above principle are shown in FIGS. 8 and 9. And one embodiment of a decimal carry correction circuit for performing these corrections is shown in FIG. 10.

FIG. 8 shows one example of the decimal carry correction to the sum output from a carry save adder, and FIG. 9 shows one example of the decimal carry correction to the higher order digit of the pertiment decimal digit. The correction amount and condition in the table of FIG. 8 is: when ("A"≦S≦"F")·("4"≦C≦"7")+("0"≦S≦"3")·("8"≦C≦"F")+("0"≦S≦"9")·("8"≦C≦"B")=1, the correction to the sum output S is made by the addition of $(6)_{10}$ (mod 16) thereto, when ("A"≦S≦"F")·("8"≦C≦"F")+("4"≦S≦"F")·("C"≦C≦"F")=1, the correction to the sum output S is made by the addition of $(12)_{10}$ (mod 16) thereto and in the other cases no correction is made. The correction amount and condition in the table of FIG. 9 is: when ("A"≦S≦"F")·("4"≦C≦"F")+("4"≦S≦"F")·("C"≦C≦"F")=1 the correction of the addition of one to the higher order digit of the pertinent decimal digit is made and in the other cases no correction is made.

Figure 10:
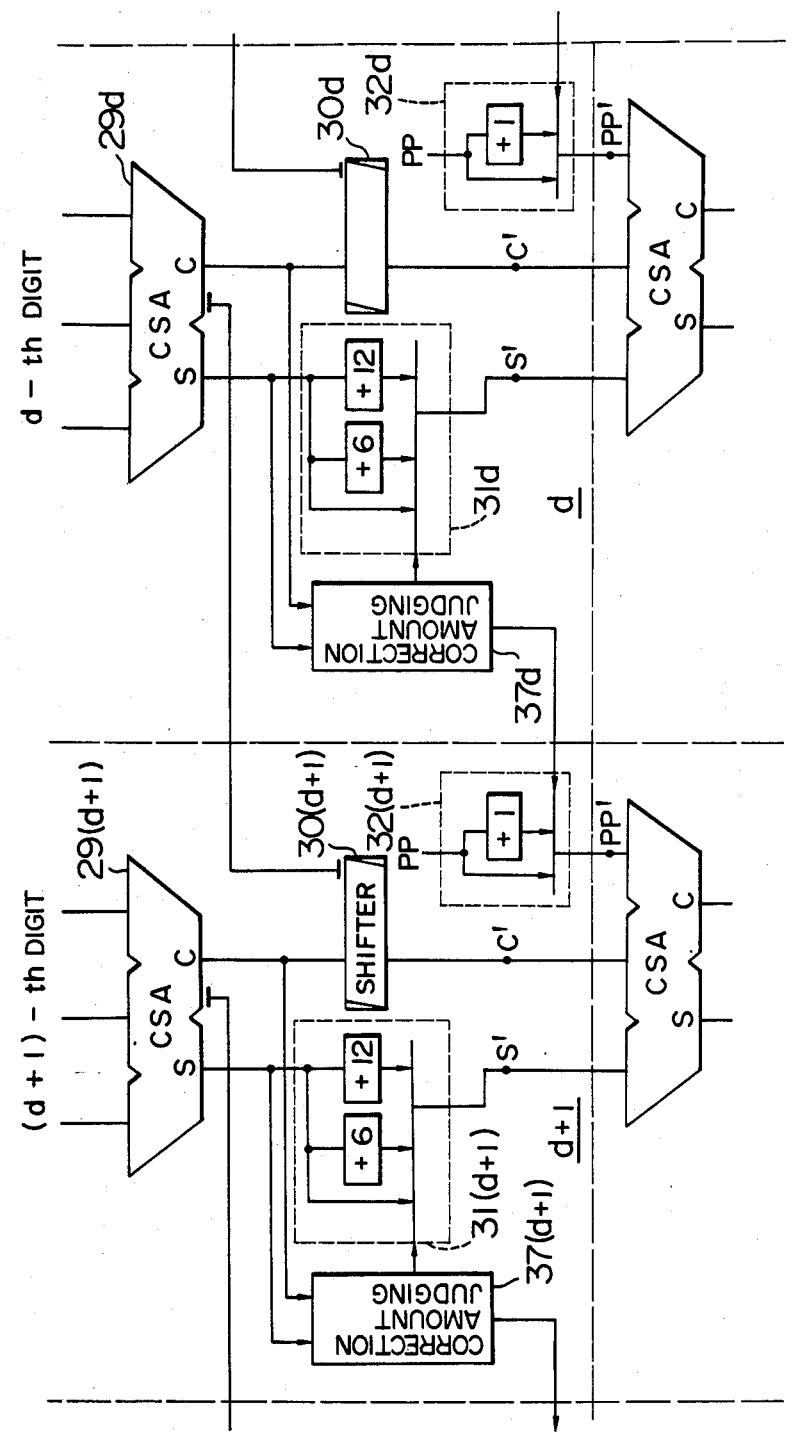
FIG. 10 is a view showing one embodiment of a decimal carry save adder unit consisting of carry save adders and decimal carry correction circuits, which are used in this invention.

FIG. 10 shows a part of the decimal carry save adder unit which uses a decimal carry correction circuit for each one decimal digit (four bits) satisfying the corrections shown in FIGS. 8 and 9. In the figure, the construction unit with one decimal digit width (decimal (d+1)th digit) at the left side is a decimal higher order digit of the construction unit (decimal dth digit) at the right side. The correction to the sum output from the carry save adder is made by the sum output correction circuit 31 on the basis of the judgement result from a correction amount judging circuit 37 using the values of the sum output S and the carry output C from the carry save adder 29 as inputs for each decimal digit as follows: where the condition [{("A"≦S≦"F")·("4"≦C≦"7")}+{("0"≦S≦"3")·("8"≦C≦"F")}+{("0"≦S≦"9")·("8"≦C≦"B")}], as indicated in FIG. 8, is satisfied, the value resulting from the addition of 6 (mod 16) to the sum S is selected as the sum S' after correction; where the condition [{("A"≦S≦"F")·("8"≦C≦"F")}+{("4"≦S≦"F")·("C"≦C≦"F")}], also as indicated in FIG. 8, is satisfied, the value resulting from the addition of 12 (mod 16) to the sum S is selected as the sum S' after correction and where neither of the above two conditions is satisfied, the value of the sum S itself is selected as the sum S' after correction.

The correction of the addition of one to the higher order digit of the pertinent decimal digit is made for the decimal partial input PP of carry save adder in the next stage, and is made by the decimal higher order digit correction circuit 32 on the basis of the judgment result from the above correction amount judging circuit 37 using the sum S and the carry C as inputs as follows: where the condition [{("A"≦S≦"F")·("4"≦C≦"F")}+{("4"≦S≦"F")·("C"≦C≦"F")}], as indicated in FIG. 9, is satisfied the value resulting from the addition of one to the decimal partial product input PP to the higher-order digit carry save adder of the pertinent decimal digit in the next stage is selected as the decimal partial product input PP' after correction, and when the above condition is not satisfied, the decimal partial product input PP itself is selected as the decimal partial input PP' after correction. When the carry output C from the carry save adder is input to the carry save adder of the next stage to the binary full adder for binary full-addition of the sum and carry of the final product, the carry output C is one-bit left-shifted by the one bit left shift circuit 30 and is employed as the input C' of the next stage.

For example, in the case where S="0" and C="8", since the correction condition of {("0"≦S≦"3")·("8"≦C≦"F")} is satisfied, the value resulting from the addition of 6 (mod 16) to the sum S is selected as the sum S' after correction, and on the other hand since no correction condition to the higher order digit is satisfied, the value itself of the decimal partial product PP is selected as the decimal partial product PP' of the higher-order carry save adder of the pertinent decimal digit in the next stage. Consequently S'=S+"6" (mod 16)="0"+"6" (mod 16)="6", C'="10" or C'="11" and the high order digit PP' is PP'=PP. Further, in the case where S="4", C="C", since one of the correction conditions; {("4"≦S≦"F")·("C"≦C≦"F")} is satisfied, the value resulting from the addition of 12 (mod 16) to the sum S is selected as the sum after correction, and on the other hand, since one of the correction conditions to the higher order digit {("4"≦S≦"F")·("C"≦C≦"F")} is also satisfied, the value resulting from the addition of one to the decimal partial product input PP is selected as the decimal partial product input PP' of the higher order carry save adder of the pertinent decimal digit in the next stage. Consequently, S=S+"C" (mod 16)="4"+"C" (mod 16)="0", C'="18" or C'="19" and the higher order digit PP' is PP'=PP+1.

In FIG. 10, the lines of S, S', C, C', PP and PP' are those which include 4 bits, respectively. Therefore, even if a carry occurs from the most significant bit in the correction circuit 31 as a result of the addition of $(6)_{10}$ ((0110)$_2$ is added to the S input with 4 bits) or of $(12)_{10}$ ((1100)$_2$ is added to the S input with 4 bits), it is discarded.

Figure 12:
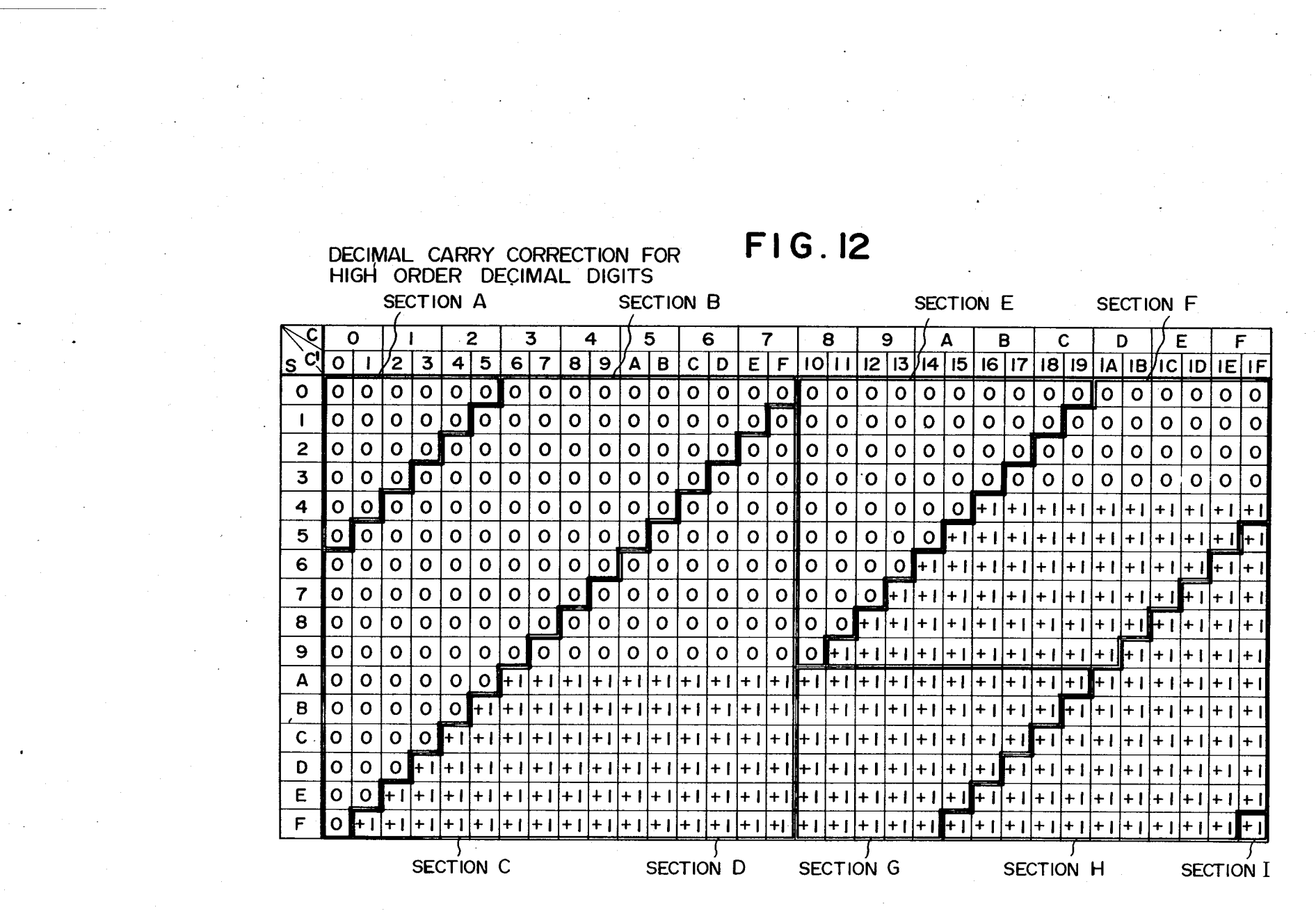
Figure 13:
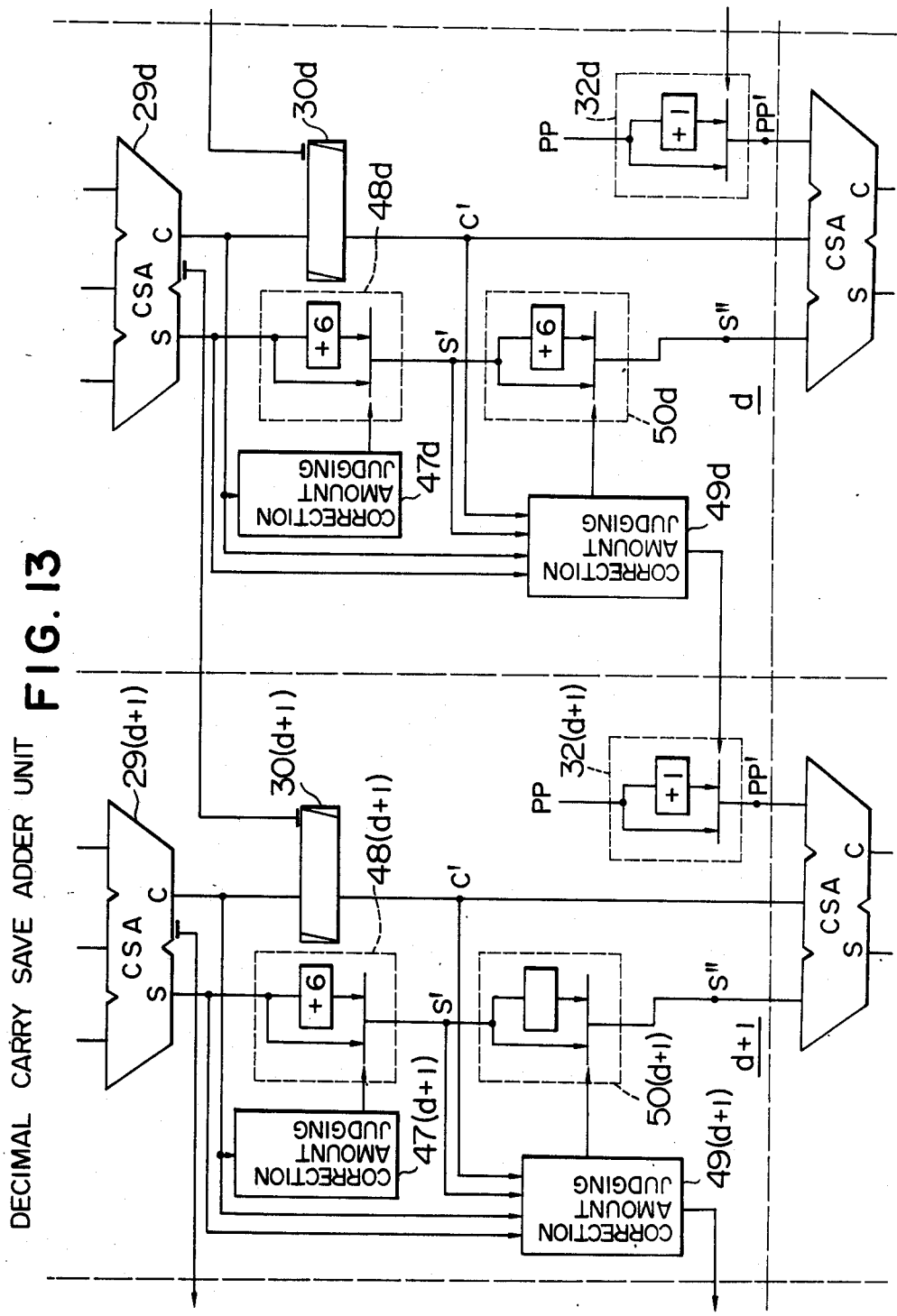
FIG. 13 is a view showing the other embodiment of the decimal carry save adder unit consisting of carry save adders and decimal carry correction circuits.

FIGS. 11 and 12 show the other embodiments of the decimal carry correction tables which satisfy the decimal carry corrections to the sum output and the higher order digit of the pertinent decimal digit in the sections A~I of the addition table of FIG. 7 and are used to implement a decimal loop adder using a carry save adder. FIG. 13 shows the other embodiment of a decimal carry correction circuit for performing these corrections.

FIG. 11 shows the other example of the decimal carry correction to the sum output from a carry save adder. The correction amount and the correction condition in FIG. 11 are composed of two steps. In the first correction, in the case where ("8"≦C≦"F")=1, the addition of 6 (mod 16) is made to the sum output S from the carry save adder, and in the other cases no correction thereto is made. The sum output S subjected to the first correction is selected as S' and the value resulting from the one bit left shift of the carry output of the carry save adder is employed as C'. In the second correction, in the case where ("A"≦S≦"F")·("8"≦C≦"F")+(-"A"≦S'≦"F")·(G=1)=1, the addition of 6 (mod 16) is made to S', and in the other cases, no correction is made, where $$G' = g_0' + p_0' \cdot g_1' + p_0' \cdot p_1' \cdot g_2' + p_0' \cdot p_1' \cdot p_2' \cdot p_3',$$

$$g_i' = S_i' \cdot C_i' \quad (i=0\sim2)$$

$$p_j' = S_j' + C_j' \quad (j=0\sim2)$$

$S_0' \sim S_3$ and $C_0' \sim C_3'$ are bit representations of S' and C' which have one decimal digit, respectively, and $S_0'$ and $C_0'$ are the most significant bits while $S_3'$ and $C_3'$ are the least significant bits. G' is a condition where a carry is generated as a result of binary full-addition of S' and C'.

FIG. 12 shows the other embodiment of the decimal carry correction table for the higher order digit of the pertinent decimal digit. The correction amount and condition in FIG. 12 is shown below: when ("A"≦S≦"F")·("8"≦C≦"F")+(-"A"≦S'≦"F")·(G'=1)=1, the addition of one to the higher order digit is made, and in the other case no correction is made. S', C', and G' have the same definitions as described above.

FIG. 13 shows a part of the other embodiment of the decimal carry save adder unit employing a decimal carry correction circuit for each decimal digit (four bits) which satisfies the corrections shown in FIGS. 11 and 12. In the figure, the construction unit with one decimal digit width (decimal (d+1)th digit) at the left side is a decimal higher order digit of the construction unit (decimal dth digit) at the right side. The first correction to the sum output from the carry save adder is made by a first sum output correction circuit 48 on the basis of the judgement result from a first correction amount judging circuit 47 using the value of the carry output from the carry save adder as an input for each one decimal digit as follows: where the condition ("8"≦C≦"F") is satisfied, the value resulting from the addition of 6 (mod 16) to the sum S is selected as the sum S' after the first correction and where, the above condition is not satisfied, the value itself of the sum S is selected as the sum S' after the first correction. Next, the second correction to the sum output S' from the first sum output correction circuit 48 is made by a second sum output correction circuit 50 on the basis of the judgement result from a second correction amount judging circuit 49 using the values of the sum output S and the carry output C from the carry save adder and the values of the sum S' after the first correction and the carry C' resulting from the one bit left shift by the shift circuit 30 as inputs as follows: where the condition [{("A"≦S≦"F")·("8"≦C≦"F")}+{(-"A"≦S'≦"F")·(G'=1)}] is satisfied, the value resulting from the addition of 6 (mod 16) to the S' after the first correction is selected as the sum S" after the second correction and where the above condition is not satisfied, the value itself of the sum S' after the first correction is selected as the sum S" after the second correction.

The correction of the addition of one to the higher order digit of the pertinent decimal digit is made for the decimal partial product PP to the next stage of carry save adder and made by the decimal higher order correction circuit 32 on the basis of the judgement result from the second correction amount judging circuit 49 using as inputs the sum output S, the carry output C, the sum S' after the first correction and the carry C' after the one bit left shift as inputs as follows: where the condition [{("A"≦S≦"F")·("8"≦C≦"F")}+{(-"A"≦S'≦"F")·(G'=1)}] is satisfied, the value resulting from the addition of one to the decimal partial product input PP to the next stage of carry save adder of the higher order digit of the pertinent decimal digit is selected as the decimal partial product input PP' after the correction, and where the above condition is not satisfied, the decimal partial product input PP itself is selected as the decimal partial product input PP' after the correction.

For example, in the case where S="A" and C="3", since the first correction condition for the sum output ("8"≦C≦"F") is not satisfied, the sum S' after the first correction is S'=S="A", and also C'="6" or C'="7", so that the binary full addition of S' and C' generates the carry propagation to the higher order digit of the pertinent decimal digit and hence (G'=1) is satisfied. Thus, since the condition of the second correction conditions {("A"≦S'≦"F")·(G'=1)} is satisfied, the value resulting from the addition of 6 (mod 16) to the sum S' after the first correction is selected as the sum S" after the second correction, and the value obtained from the addition of one to the decimal partial product input PP is selected as the decimal partial product input PP' to the next stage of carry save adder of the higher order digit of the pertinent decimal digit since the one of the correction conditions {("A"≦S'≦"F")·(G'=1)} is also satisfied. Consequently, S"=S'+"6" (mod 16)="A"+"6" (mod 16)="0", and C'="6" or C'="7" and PP' of the higher order digit is PP'=PP+1. Further, in the case where S="8", and C"="E", since the first correction condition for the sum output ("8"≦C≦"F") is satisfied, the sum S' after the first correction is S'=S+"6" (mod 16)="8"+"6" (mod 16)="E" and also C'="C" or C'="D" so that the full addition of S' and C' generated the carry propagation to the higher order digit of the pertinent decimal digit and hence (G'=1) is satisfied. Thus, since one of the second correction conditions {("A"≦S'≦"F")·(G'=1)} is satisfied, the value resulting from the addition of 6 (mod 16) to the sum S' after the first correction is selected as the sum S" after the second correction. And the value obtained from the addition of one to the decimal partial product input PP is selected as the decimal partial product input PP' to the next stage of carry save adder of the higher digit of the pertinent decimal digit since the one of the correction condition {("A"≦S'≦"F")·(G'=1)} is also satisfied. Consequently, S"=S'+"6" (mod 16)="E"+"6" (mod 16)="4", and C'="C" or C'="0" and PP' of the higher order digit is PP'=PP+1.

The above correction operation implies that the corrections of the addition of 12 (mod 16) to the sum S and of the addition of one to the decimal partial product input PP of the higher order digit have been made through the first and second correction circuits. This indicates that the decimal carry save adder unit can be constructed without depending on a circuit construction in such a manner that the carry save adder is equipped with the correction circuit which satisfies the decimal carry correction to the sum output and the decimal higher order digit in FIGS. 11 and 12 and also satisfies those in the sections A~I of the addition table of FIG. 7.

Figure 14:
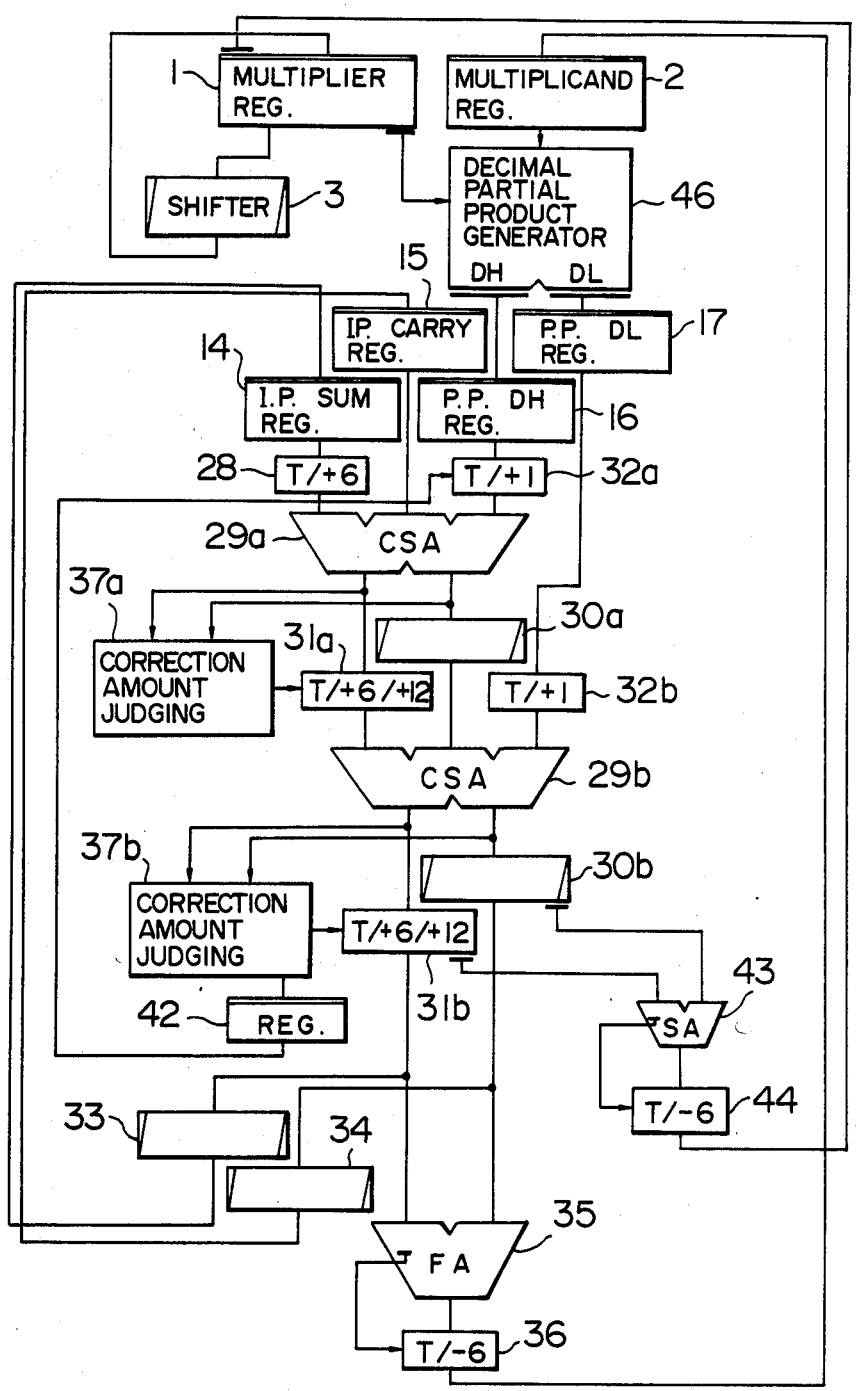
FIG. 14 is a view showing the entire decimal multiplication apparatus according to this invention which is constructed by using the decimal carry save adder of FIG. 10.

FIG. 14 shows one embodiment of the decimal multiplication apparatus which is constructed by using the decimal carry save adder unit shown in FIG. 10. In the figure, the multiplication of a multiplier of binary coded decimal set in the multiplier register 1 and a multiplicand of binary coded decimal set in the multiplicand register 2 is made as follows.

When a decimal partial product generator 46 is activated, first decimal partial product operation of the multiplicand set in the multiplicand register 2 and the multiplier of predetermined processing width (for example, one digit) partitioned out from the low order of the multiplier set in the multiplier register 1 provides the first decimal partial product. In this embodiment, the partial product obtained by one decimal partial product operation is divided into two numbers DH and DL which are set in the partial product registers 16 and 17, respectively. The DH and DL are such as indicated below. For example, when the multiplicand $(35)_{10}$ with 2 digits is multiplied by the multiplier $(6)_{10}$ with one digit, the result is $$\begin{array}{r} 35 \\ \times 06 \\ \hline 30 \quad (= 5 \times 6) \\ +18 \quad (= 3 \times 6) \\ \hline 0210 \end{array}$$

DH and DL indicated a digit string $(130)_{10}$ of higher order digits and a digit string $(080)_{10}$ of lower order digits included in the products of two digits each of which is the result of the multiplication of each one digit of the multiplicand and one digit of the multiplier, respectively.

Figure 1:
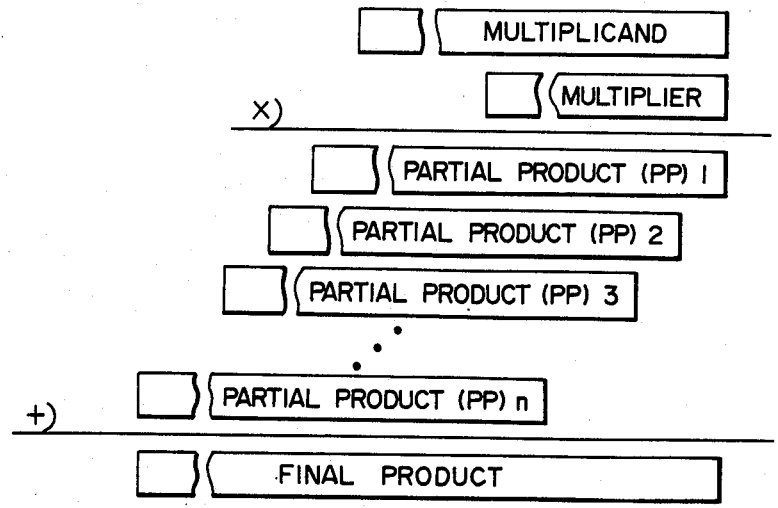
FIG. 1 is a view for explaining the process of multiplying a mutiplicand by a multiplier.
Figure 3:
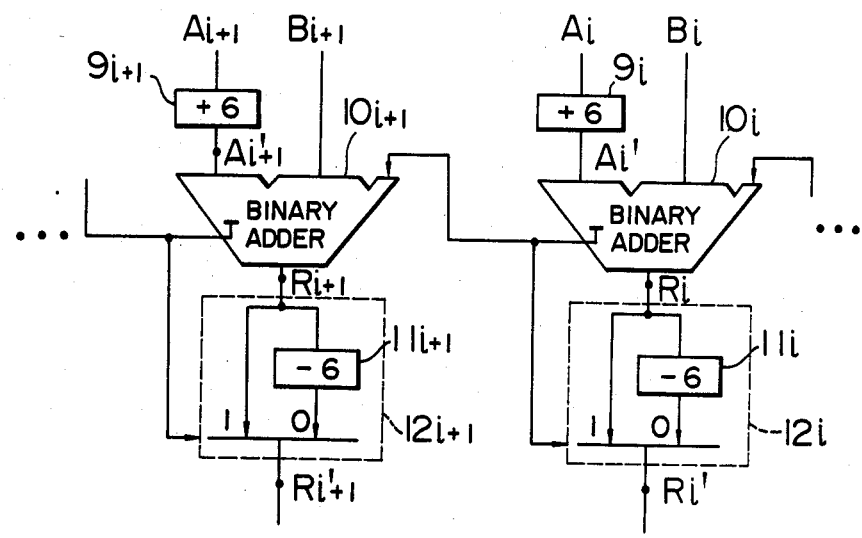
FIG. 3 is a view showing the construction of a decimal adder.
Figure 2:
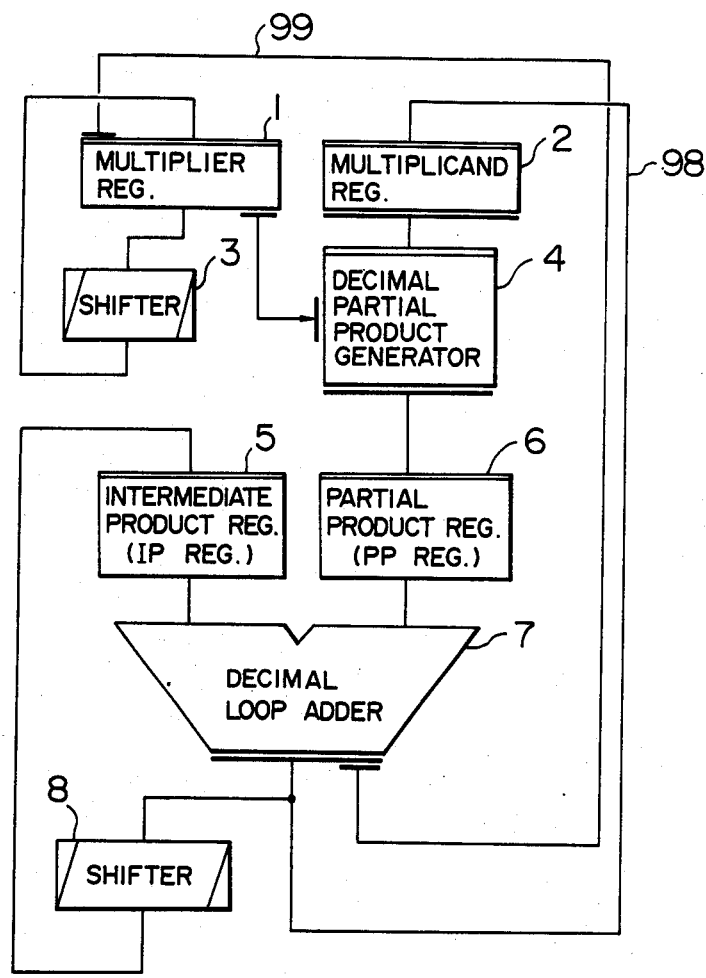
FIG. 2 is a view showing the construction of the conventional decimal multiplication apparatus.
Figure 5:
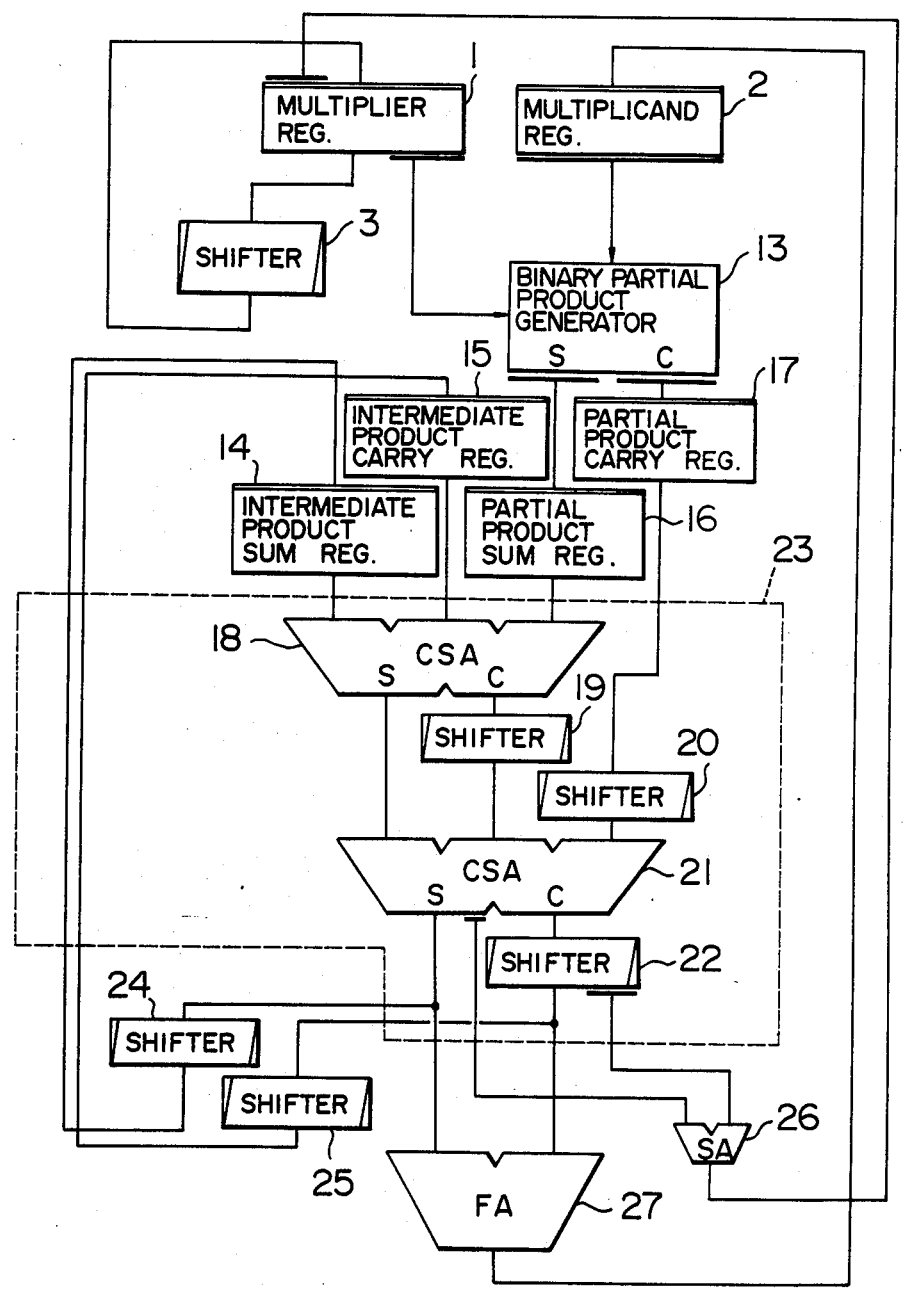
FIG. 5 is a view for the high speed binary multiplication apparatus including carry save adders.

The intermediate product sum register 14 and the intermediate product carry register 15 are set to zero as an initial state, respectively. At the same time when the partial product in the first cycle are generated, the multiplier set in the multiplier register 1 is right-shifted by the data width partitioned out and set therein again. When the initial value zero set in the intermediate product sum register 14 and the intermediate product carry register 15, and the decimal partial product DH set in the partial product register 16 are carry-save-added by a first stage of carry save adder 29a, a 6-addition circuit 28 is controlled to add 6 to each decimal digit of the output from the intermediate sum register 14 in which the initial value zero is set, on the basis of the system for adding two numbers represented by binary coded decimal notation using the binary adder shown in FIG. 3 to provide a correct sum of binary coded decimal numbers. A 1-addition correction circuit 32 is controlled so that the output itself from the partial product register 16 is selected as an input to the carry save adder. The sum output from the carry save adder 29a and the decimal partial product DL set in the partial register 17 are subjected to the decimal digit correction for each decimal digit, as mentioned above, by a sum output correction circuit 31a and a decimal higher order digit correction circuit 32b, respectively based on the judgement result of a correction amount judging circuit 37a which examines the values of the sum output and the carry output from the carry save adder 29a. The carry output from the carry save adder is one-bit left-shifted by a one bit left shift circuit 30a for bit position alignment. The sum subjected to the decimal carry correction by the sum output correction circuit 31a, the carry one-bit left-shifted by the one bit left shift circuit 30a and the decimal partial product subjected to the carry correction to the higher order digit are carry-save-added by a second stage of carry save adder 29b, the result of which is obtained in the form of sum and carry. A decimal carry correction to the sum output from the carry save adder 29b is made by a sum output correction circuit 31b based on the judgement result of a correction amount judging circuit 37b which examines the above values of the sum output and the carry output. The judgement result of the correction amount judging circuit 37b is set in the judgement result register 42, which controls the 1-addition correction circuit 32a to add one to the higher order digit at the decimal partial product DH input to the carry save adder in a next cycle. A carry output from the carry save adder 29b is one-bit left-shifted by a one bit left shift circuit 30b for bit position alignment. The sum subjected to the decimal carry correction by the sum output correction circuit 31b and the carry one-bit left-shifted by the one bit left shift circuit 30b are right-shifted by shifters 33 and 34 by a predetermined processing data width of the multiplier, and are set in the intermediate product sum register 14 and the intermediate product carry register 15, respectively. The data of the predetermined low order multiplier processing width of the output from the sum output correction circuit 31b and the output from the one bit left shift circuit 30b, i.e., the sum and carry of the lowest order of final product with the predetermined processing width of multiplier are input to a spill adder and binary full added thereby. When a carry is propagated to a higher order digit of the pertinent decimal digit, the result of addition is selected as the value of that decimal digit, and on the other hand where no carry is propagated, the correction of the subtraction of 6 is made, i.e., the value resulting from the subtraction of 6 by the 6-subtraction circuit 44 is selected as the value of that decimal digit of the final product. These operations are performed for each decimal digit. The obtained value as the part of the final product with the predetermined processing width of multiplier is transferred to and set in the highest order part of the multiplier register 1 with the predetermined processing width of multiplier.

Except that the addition of 6 by the 6-addition circuit 28 is not performed, the same processing is repeated for all of the significant digits of the multiplier. Thus, the lower order portion of the final product with the width of the multiplier significant digits is left-aligned in the multiplier register 1 while the higher order portion of the final product is obtained at the sum output and the carry output from the carry save adder 29b in the operation cycle for a final significant digit. As shown in the addition table of FIG. 7, there are the cases where the addition of one to the higher order digit of the pertinent decimal digit is required for certain combinations of the sum output and the carry output. Therefore, after the processing is repeated for all of the significant digits of the multiplier, as described above, the above processing is repeated one more cycle by using zero of the higher order to the significant digits of the multiplier. Thus, the addition of one to the higher order digit of the pertinent decimal digit is completed. The obtained sum and carry of the final product, i.e., the output from the sum output correction circuit 31b and the output from the one bit left shift circuit 30b are binary full-added by a binary full adder 35. Thereafter, when a carry is propagated to a higher order digit of the pertinent decimal digit, the addition result itself is selected as the value of that decimal digit, and on the other hand when no carry is propagated, the correction of the subtraction of 6 is made, i.e., the value resulting from the subtraction of 6 by the 6-subtraction circuit 36 is selected as the value of that decimal digit of the final product. These operations are performed for each decimal digit. The obtained value of the higher order portion of the final product is transferred to and set in the multiplicand register 2.

In the manner as mentioned above, the decimal multiplication of a multiplier of binary coded decimal notation and a multiplicand of the same notation is performed by a decimal multiplication apparatus which includes decimal carry save adder unit consisting of a carry save adder and a decimal carry correction circuit, and thus the product of binary coded decimal numbers can be obtained.

Figure 15:
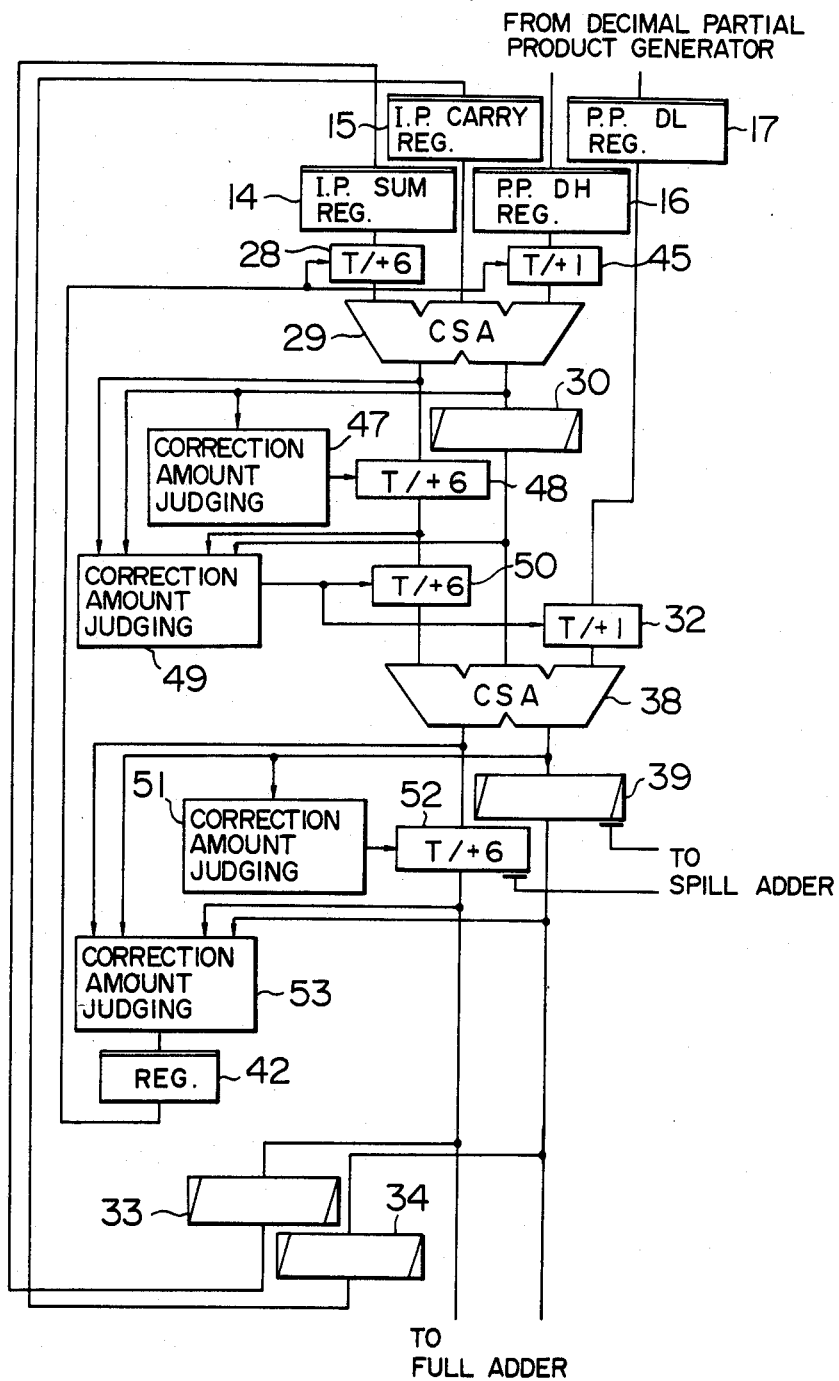
FIG. 15 is a view showing the decimal loop adder section of the decimal multiplication apparatus according to this invention which is constructed by using the decimal carry save adder unit of FIG. 13.

FIG. 15 shows a part of the decimal loop adder which is equipped with the decimal carry save adder unit shown in FIG. 13. This decimal loop adder can also provide a product of binary coded decimal by the decimal multiplication of a multiplier of binary coded decimal and a multiplicand or binary coded decimal through the same processing as mentioned referring to FIG. 14. The entire operation of FIG. 15 is the same as that of FIG. 14 and so the explanation therefor is omitted.

As described referring to FIG. 14, the decimal multiplication apparatus according to the embodiment of this invention is controlled in such a manner that the sum and carry of the final product obtained by the decimal loop adder are full-added by a binary full adder and thereafter the correction of the subtraction of 6 is made for each decimal digit depending upon whether or not the carry propagation to a higher order digit occurs so as to provide a correct binary coded decimal, and in such a manner that after the processing is repeated for all of the significant digits of multiplier, the operation is repeated one more cycle by using zero of the highest order of the significant digits of the multiplier to complete the one addition correction to the higher order digit.

Figure 16:
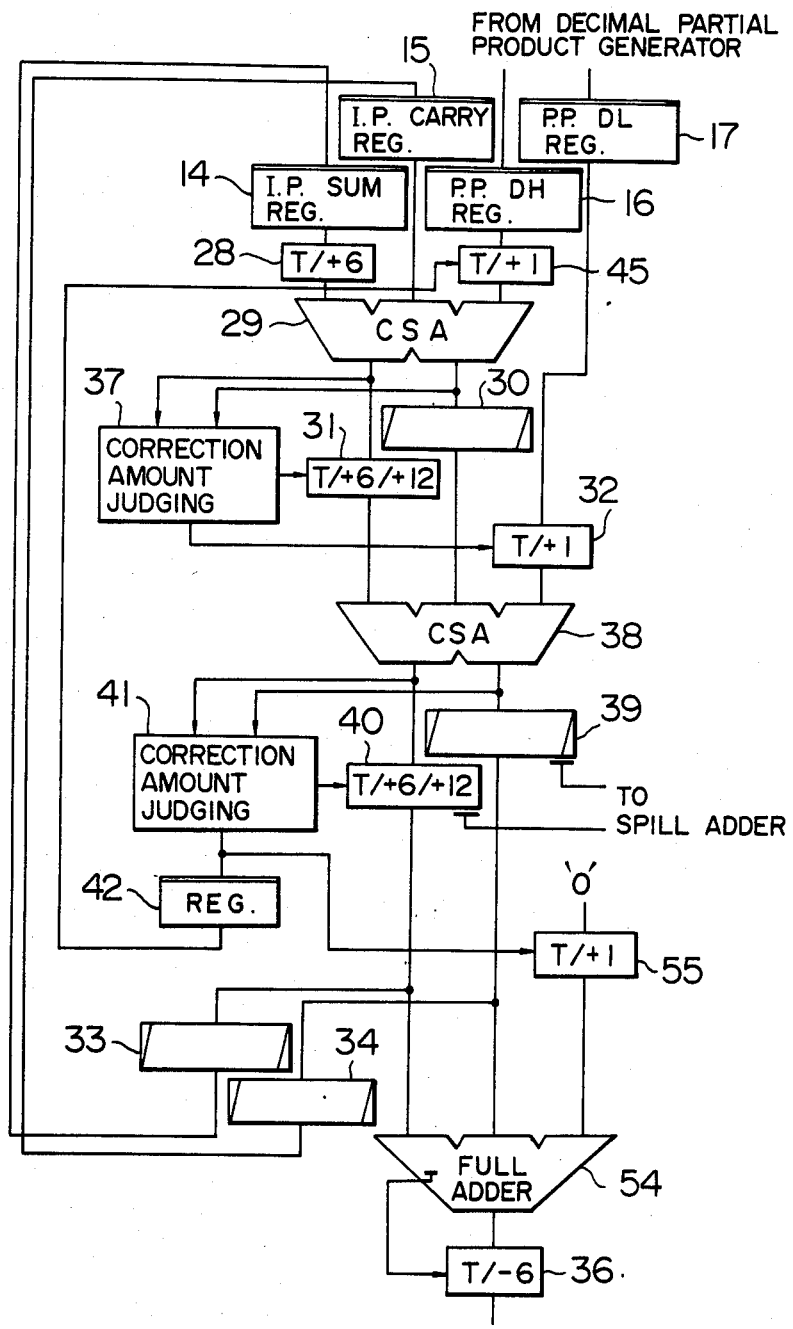
FIG. 16 is a view showing the other embodiment of the decimal multiplication apparatus according to this invention.

FIG. 16 shows the other embodiment of the decimal multiplication apparatus according to this invention. In this embodiment, in order that the final operation cycle performed using zero of the higher order digit to the significant digits is not required, the output from a 1-addition correction circuit 55 as well as the sum and carry of the final product is input to the binary full adder 54 having three inputs for each decimal digit, and where the one addition correction to the higher order digit of each pertinent decimal digit is required, as a result of the operation for the most significant digit. The one addition corrections to the higher order digits are accomplished by the three input binary full adder.

The decimal multiplication apparatus according to this invention has such an advantage as the decimal loop adder thereof can be operated with the substantially same performance as that of a binary multiplication loop adder. The decimal loop adder is constructed by using a decimal carry save adder in which a carry save adder employed for high speed binary multiplication is equipped with a decimal carry correction circuit. The decimal carry correction can be implemented by a relatively small amount of hardware. The decimal multiplication according to this invention can accomplish approximately four times high speed of loop performance compared with that of the conventional decimal multiplication apparatus.

Further, since the decimal multiplication apparatus according to this invention is constructed by equipping a binary carry save adder as a basic constructive element with a decimal carry correction circuit, a slight modification of control for the loop adder in the apparatus of this invention permits this invention to be applied to both binary multiplication and decimal multiplication.

We claim:

1. An apparatus for decimal multiplication for obtaining a product of a multiplier and a multiplicand both expressed in binary coded decimal for wherein the multiplier is divided into n groups each constituted by at least 1 digit, n partial products are successively produced over n cycles by partial multiplication between the multiplicand and the n groups of the multiplier and a partial product produced during a cycle is added to an intermediate product so that the result of the addition is used as a renewed intermediate product for the next addition to a partial product produced during the next cycle, comprising:

(a) decimal partial product generating means for successively generating the n partial products of the multiplier and multiplicand over the n cycles;

(b) an intermediate product sum register and an intermediate product carry register for holding said intermediate product represented in the forms of sum and carry;

(c) adding means for adding 6 to each digit of the intermediate product sum from said intermediate product sum register;

(d) a decimal carry save adder unit, which includes a binary carry save adder, for decimal carry-save-adding the partial product from said partial product generating means, the intermediate product sum from said intermediate product sum register and the intermediate product carry from said intermediate product carry register, for outputting the result of addition in the form of a sum output and a carry output and applying the resultant sum and carry to said intermediate product sum register and said intermediate carry register, respectively;

(e) said decimal carry save adder unit including correction means for correcting the sum output from said binary carry save adder for each digit and correcting a partial product from said partial product generating means at a next cycle for each digit on the basis of the sum and carry outputs from said binary carry save adder;

(f) full adder means for binary-full-adding said sum output and carry output from said decimal carry save adder unit; and (g) 6-subtraction means for outputting the output from said full adder means or the value resulting from the subtraction of 6 therefrom for each digit as a multiplication result according to the existence of a carry propagation from each digit to a higher order digit thereof in said full adder means.

2. An apparatus for decimal multiplication according to claim 1 wherein said correction means comprises:

judgement means for judging for each digit whether or not it is necessary to correct said sum output of a corresponding digit and to correct the carry of the higher order digit of the corresponding digit on the basis of the sum and carry as outputs from said binary carry save adder;

sum output correction circuit means for correcting the sum output from said binary carry save adder for each digit on the basis of the judgement result as to whether or not the correction to the sum output is required for the judging means; and higher order digit correction circuit means connected between said partial product generating means and said binary carry save adder, for correcting the partial product at the next cycle for each digit on the basis of judgement result as to whether or not the carry correction is required in said judging means.

3. An apparatus for decimal multiplication according to claim 2, wherein said decimal carry save adder unit includes first shift means for shifting the carry output from said binary carry wave adder to one bit higher order position thereto and outputting it.

4. An apparatus for decimal multiplication according to claim 3, further comprising second shift means for shifting the sum and the carry from said decimal carry save adder unit at the preceding cycle for digit alignment at the next cycle, respectively, and applying the resultant sum and carry to said intermediate product sum register and said intermediate product carry register, respectively.

5. An apparatus for decimal multiplication according to claim 4, further comprising spill adder means for adding a number of lower order digits, equal to the number of the digits shifted by said second shift means, of the sum output and the carry output from said decimal carry save adder unit, and 6-subtraction means for outputting the output itself from said spill adder means for outputting the output itself from the substraction of 6 therefrom for each digit as a multiplication result of the spilled-out digits according to the existence of carry propagation from each digit to a higher order digit thereto in said spill adder means.

6. An apparatus for decimal multiplication according to claim 1, wherein said partial product generating means outputs each partial product divided into a higher order digit portion and a lower order digit portion; said higher digit portion indicates a result constituted by extracting the higher order digits of each product of each digit of the mulitplicand and one group of the multiplier, while said lower order digit indicates a column of the lower order digits thereof; said decimal carry save adder unit includes first and second binary carry save adders which are connected in the cascade of two stages; the higher order digit portion from said partial product generating means, the intermediate product sum from said intermediate product sum register, and the intermediate product carry from said intermediate carry register are input to said first binary carry save adder while the sum and carry from said first binary carry save adder and the lower order digit portion from said partial product generating means are input to said second binary carry save adder; and said correction means includes a first correction means for correcting the sum output from said first binary carry save adder for each digit and the lower order digit portion from said partial product generating means for each digit on the basis of the sum and carry as outputs from said first binary carry save adder, and second correction means for correcting the sum output from said second binary carry save adder for each digit and the higher order digit portion from said partial product generating means for each digit on the basis of the sum and carry as outputs from said second carry save adder.

7. An apparatus for decimal multiplication according to claim 6, wherein said decimal save adder unit includes third shift means for shifting the carry output from said first binary carry save adder means to a one-bit higher order position and inputting it so said second binary carry save adder and fourth shift means for shifting the carry output from said second binary carry save adder to a one-bit higher order position and outputting it as the carry output form said decimal carry save adder unit.

8. An apparatus for decimal multiplication according to claim 7, further comprising fifth shift means for shifting the sum and carry from said decimal carry save adder unit for digit position alignment at a succeeding cycle, respectively and inputting them to said intermediate product sum register and said intermediate product carry register.

9. An apparatus for decimal multiplication according to claim 8, further comprising second shift means for shifting the sum and the carry from said decimal carry save adder unit at the preceding cycle for digit alignment at the next cycle, respectively, and applying the resultant sum and carry to said intermediate product sum register and said intermediate product carry register, respectively.

10. An apparatus for decimal multiplication according to claim 9, further comprising spill adder means for adding a number of lower order digits, equal to the number of the digits shifted by said second shift means, of the sum output and the carry output from said decimal carry save adder unit, and 6-subtraction means for outputting the output itself from said spill adder means or the value resulting from the subtraction of 6 therefrom for each digit as a multiplication result of the spilled-out digit according to the existence of carry propagation from each digit to a higher order digit thereto in said spill adder means.

11. An apparatus for decimal multiplication according to claim 7, wherein said first correction means includes third correction means for correcting an output from said first binary carry save adder for each digit on the basis of the sum and carry as outputs from said first binary carry save adder, and fourth correction means for correcting a sum output from said third correction means for each digit and the lower order digit portion from said partial product generating means for each digit.

* * * * *